3,094,387
PROCESS FOR PREPARING BORON PHOSPHIDE
Forrest V. Williams, Dayton, Ohio, assignor to Monsanto Chemical Company, St. Louis, Mo., a corporation of Delaware
No Drawing. Filed Oct. 21, 1957, Ser. No. 691,158
3 Claims. (Cl. 23—204)

The present invention relates to a new form of boron phosphide.

It is an object of this invention to provide a new form of boron phosphide, BP, in the form of a well-crystallized, hard, thermally stable and chemically inert material. It is a further object to provide a new and highly abrasive, chemically resistant form of boron phosphide which may be prepared in the form of granular, crystalline particles suitable for use as an abrasive material. It is a still further object of this invention to provide a process by which structures such as refractory articles, chemical apparatus or turbine blades may be prepared from boron phosphide. Further objects and advantages of my invention will be apparent from the following description.

My improved form of boron phosphide is readily prepared by exposing boron in elementary form to phosphorus vapor at an elevated temperature. For this purpose boron in the form of amorphous or crystalline particles is employed. Amorphous boron is available commercially in the finely-divided state and may be directly employed in this readily-available form. Crystalline boron is also available commercially in various degrees of sub-division and may also be employed in this form. The reaction here involved is somewhat slower for the crystalline form of boron; however, the reaction may be caused to proceed to any degree of completeness merely by continuing the treatment with phosphorus vapor for a sufficiently long period of time, or by increasing the temperature at which the reaction is carried out, or by other means hereinafter disclosed.

The temperature of reaction between the boron and phosphorus will generally be above about 800–900° C. and may be as high as 1,500° C. or even higher. The time required for the reaction is dependent upon the temperature and degree of subdivision of the boron and the ease with which the phophorus vapor penetrates the mass of boron powder. A catalytic quantity of a halogen, such as chlorine, bromine or iodine may be used for the purpose of accelerating the phosphide-forming reaction. By the use of these catalytic materials the reaction may be caused to take place at a lower temperature than would be necessary in the absence of such agent.

When exposing the boron to the action of phosphorus vapor the boron powder may be spread out in a relatively thin layer, so that the phosphorus vapor quickly penetrates the entire mass. However, a compact mass of powder may also be treated with phosphorus vapor, under which conditions the diffusion of the vapor into the mass of powder will, of course, be somewhat slower. When working with loose, uncompacted masses of boron particles I have found that the zone of penetration and reaction of the phosphorus vapor with the loose boron will be more or less sharply defined and that it is possible after cooling the mass to physically separate the boron phosphide sintered mass from the loose and unreacted boron. The unreacted or partly reacted boron particles may, of course, be returned to the reaction for further treatment. The boron phosphide produced either in loose crystalline form or in the form of a compact, sintered mass may be freed of unreacted boron by boiling in concentrated nitric acid.

Boron phosphide as herein prepared is a highly crystalline material with a cubic crystalline structure having a unit cell length of about 4.537 Angstrom units. Its hardness lies between 8 and 9 on Mohs' scale (diamond equals 10). It is, however, not as hard as silicon carbide. Thus, it will scratch and abrade quartz, porcelain, agate, cemented tungsten and possibly sapphire. When exposed to a flame at 1200° C. in air it will not burn. A thin coating of boron phosphate apparently forms on the exposed surface, which coating protects the phosphide against further penetration of air or oxygen at these high temperatures. While I have been unable to melt the phosphide, from theoretical considerations and by analogy with data on similar compounds, it should melt at a temperature greater than about 3000° C.

Cubic boron phosphide as prepared by me is not attacked by any reagent which I have tried. It is completely stable to boiling nitric acid and to boiling aqua regia. It was impossible to burn it in an atmosphere of chlorine at three atmospheres pressure even when red phosphorus was used as an initiator.

Useful articles, such as chemical apparatus, including crucibles, refractories and parts for jet engines, such as turbine blades, deflectors or nozzles, which are normally exposed to high temperatures are readily fabricated according to my process. By reason of the extreme hardness of the product, these objects are resistant to the action of abrasive particles such as fly ash which may be present in the high temperature gases of a jet engine.

Elemental boron powder is easily pressed into various shapes by methods long familiar to those skilled in the art of powder metallurgy. I take the articles so produced and expose them at temperatures above 800–900° C. to the vapor of phosphorus for the desired length of time. The reaction commences at the surface of the article forming the compound BP thereon and as the treatment is continued the phosphorus penetrates the surface and gradually works its way into the center of the article, ultimately converting the entire mass to boron phosphide. The time required for complete reaction will be dependent upon the temperature, the mass of material treated, the degree of porosity of the article, the particle size and also upon the pressure of phosphorus vapor. By employing a suitable container the pressure of phosphorus vapor may be raised from atmospheric to several atmospheres, and in extreme cases even to several hundred atmospheres. By this means, even relatively large and bulky articles may be substantially completely converted to boron phosphide.

It is also possible, of course, to sinter objects pressed from the boron phosphide crystalline powder which is readily prepared as described below. When pressing boron phosphide powder into pressed objects the green strength of the piece will depend upon the amount of pressure exerted in the die. If necessary, organic binders, e.g., resinous polymers, may be employed in small quantities to increase the green strength of the piece. The pressed article of boron phosphide so prepared is then subjected to a temperature ranging upwardly from about 1300° C. to about 2500° C. for a sufficient length of time to develop the required strength.

The following are examples of the present invention.

*Example 1*

A graphite crucible was prepared by drilling a 5/16" hole in a cylindrical piece of ½" graphite rod. Into the crucible so formed was placed 0.4176 g. of amorphous boron and 0.0524 g. of iodine crystals. The crucible was next placed into a ¾" O.D. quartz tube 10" long, one end of which had been sealed off. Into the quartz tube was also placed 1.1976 g. of red phosphorus. The tube was evacuated and then sealed off. The sealed tube was then placed vertically into an electric furnace with about 2 inches of the tube projecting above the furnace and gradually heated until the temperature of that part of the tube adjacent to the crucible had reached 962° C.

The temperature of the crucible and tube was read by means of a thermocouple fastened to the outside of the quartz tube opposite the middle of the contained crucible.

The heating of the quartz tube and crucible caused the red phosphorus to vaporize, forming phosphorus vapor filling the entire tube, which vapor then reacted with the hot boron contained in the crucible. The crucible and contents were above a temperature of 600° C. for approximately two hours and above 900° C. for about one hour.

Upon completion of the heating described above, the quartz tube was cooled, broken open in a dry box and the crucible and contents weighed. The original quantity of boron had increased in weight by 0.3204 g., which increase calculates out to a 33.8% conversion to boron phosphide. The sample of product taken from the top of the material in the crucible was found to be insoluble in boiling nitric acid. The material from the lower part of the crucible reacted much more slowly with concentrated nitric acid than did the boron starting material, showing that although not completely reacted, some reaction had also occurred with the boron in the lower part of the crucible.

A sample of the hard product taken from the top of material in the crucible was examined by X-ray diffraction and found to be crystalline. The measurements indicated a cubic structure with unit cell length of about 4.537 Angstrom units. Typical interplanar spacing and intensity data of the prominent lines were as follows (Ni filtered, CuK alpha radiation):

| $d$ value (A.) | Intensity I/I |
| --- | --- |
| 2.63 | 100 |
| 2.28 | 19 |
| 1.61 | 30 |
| 1.37 | 19 |
| 1.31 | 3 |
| 1.14 | 2 |
| 1.04 | 6 |
| 1.02 | 4 |
| 0.928 | 6 |
| 0.871 | 6 |
| 0.803 | 3 |

*Example 2*

A quartz tube having an O.D. of ¾ inch and an overall length of ten inches was charged with 1.4556 grams of elemental amorphous boron contained in a graphite boat positioned at one end of the tube while 4.3633 grams of red phosphorus were placed in a graphite crucible at the other end of the tube. The quartz tube was evacuated and sealed off and was then placed horizontally in an electrical furnace having zone temperature controls so that the end of the furnace with the amorphous boron could be maintained at 1200° C. while the end containing the phosphorus source was kept at about 450° C. These conditions were maintained for about 46 hours, after which the furnace was cooled, the quartz tube opened, and the contents removed. The product was examined and it was found that a conversion of 96.5% was obtained with the formation of the cubic crystalline variety of boron phosphide. The product was a dense, black material which had a Mohs' hardness of about nine.

*Example 3*

Finely-divided boron powder was pressed into a 9 mm. I.D. by 22 mm. deep zirconia crucible by pressing with a graphite rod in such a manner that the powder was packed firmly about the sides and bottom of the crucible. Two boron crucibles were prepared in this manner, weighing respectively (a) 0.6560 g. and (b) 0.6242 g. The zirconia crucibles containing the pressed boron were then placed in a ¾ inch quartz tube 10 inches long, together with 4.502 g. of red phosphorus. The phosphorus was contained in a graphite boat and placed at the opposite end from that occupied by the crucibles. The quartz tube was then evacuated and sealed. Next the tube was placed into an electric furnace in a horizontal position, the furnace being arranged so that the tube section containing the crucibles was heated to a temperature within the range of 1120°–1160° C., while the end containing the red phosphorus was heated to a temperature in the range of 390°–430° C. At this temperature the red phosphorus vaporized, giving a pressure of phosphorus vapor within the tube of about two atmospheres. Heating of the whole arrangement was continued for 60 hours, at the end of which time the tube was removed, cooled and opened. The boron phosphide was firmly bonded together in the form of a crucible and each was readily removed from its zirconium container and weighed. Crucible (a) had taken up 1.5936 g., while crucible (b) had taken up 1.4912 g. of phosphorus. The phosphorus content of the boron phosphide crucibles were, respectively, (a)=70.9%, and (b)=70.6%. This is equivalent to a 95.7 and 95.3% conversion.

It will, of course, be understood that any source of phosphorus vapor may be used. For convenience in handling, the red variety will generally be readily available and safer to use than the yellow variety. However, it is understood that either variety of phosphorus may be used, and as a matter of fact, any of the known allotropic modifications of phosphorus are useful. I may also use those compounds of phosphorus which, upon heating, decompose with the formation of phosphorus vapor.

What is claimed is:

1. Process for the preparation of crystalline boron phosphide which comprises contacting solid boron with the vapor of phosphorus at a temperature between about 800° C. and 1500° C.

2. A process as in claim 1 in which the phosphorus vapor is obtained by heating red phosphorus to vaporize the same.

3. Process for the production of shaped objects which comprises pressing a mass of finely divided solid boron powder into the desired shape, and thereafter heating the said object at a temperature of from 800° C. to 1500° C. while contacting the said object with vapors of elemental phosphorus.

References Cited in the file of this patent

UNITED STATES PATENTS

| 2,467,647 | Alexander | Apr. 19, 1949 |
| 2,759,861 | Collins et al. | Aug. 21, 1956 |
| 2,798,989 | Welker | July 9, 1957 |
| 3,021,196 | Merkel | Feb. 13, 1962 |

FOREIGN PATENTS

| 286,992 | Germany | Sept. 4, 1915 |

OTHER REFERENCES

Popper: "Nature," vol. 179, page 1075 (May 25, 1957).